United States Patent [19]

Polubinski

[11] Patent Number: 5,480,012
[45] Date of Patent: Jan. 2, 1996

[54] NOISE AND VIBRATION REDUCTION IN A TORQUE CONVERTER CLUTCH ASSEMBLY

[75] Inventor: Ann T. Polubinski, Canton, Mich.

[73] Assignee: Ford Motor Company, Dearborn, Mich.

[21] Appl. No.: 334,174

[22] Filed: Nov. 3, 1994

[51] Int. Cl.⁶ .............................. F16H 45/02; F16D 3/70
[52] U.S. Cl. ..................... 192/3.29; 192/70.17; 192/200; 464/71
[58] Field of Search .................................. 192/3.28, 3.29, 192/3.3, 30 V, 70.17, 106.1; 464/71, 78

[56] References Cited

U.S. PATENT DOCUMENTS

| | | | |
|---|---|---|---|
| 1,266,609 | 5/1918 | Mills | 464/71 |
| 3,813,898 | 6/1974 | Hatch | 464/71 |
| 4,105,102 | 8/1978 | Nels | 192/106.1 |
| 5,209,330 | 5/1993 | Macdonald | 192/3.29 |
| 5,337,867 | 8/1994 | Kirkwood | 192/3.29 |
| 5,383,540 | 1/1995 | Macdonald | 192/3.29 |

*Primary Examiner*—Richard M. Lorence
*Attorney, Agent, or Firm*—Frank G. McKenzie; Roger L. May

[57] ABSTRACT

A piston pin (124, 156) fixed to a piston plate (60) includes a body portion extending into a hole (112) formed in a drive plate (70) that is fixed to an impeller cover. A spring clip sleeve (128, 162) includes a sleeve surrounding the pin body and located in the drive plate hole. The sleeve, resiliently contacting the pin body and the surface of the hole at angularly spaced positions, drivably connects the drive plate and piston plate.

12 Claims, 3 Drawing Sheets

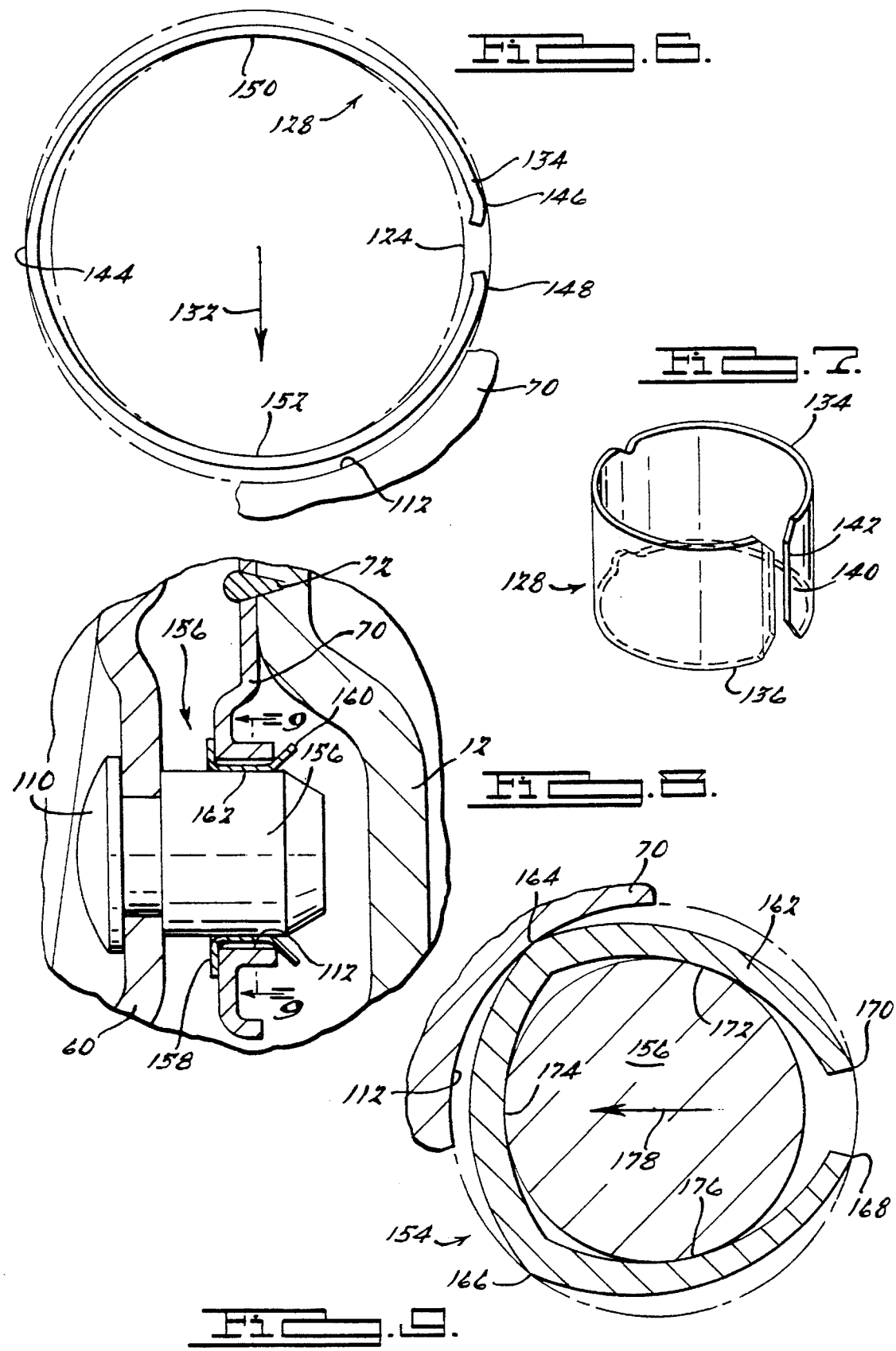

5,480,012

NOISE AND VIBRATION REDUCTION IN A TORQUE CONVERTER CLUTCH ASSEMBLY

BACKGROUND OF THE INVENTION

1. Field of the Invention

This invention relates to the field of torque converters for automatic transmissions. The invention pertains particularly to a bypass clutch, which mechanically connects a turbine wheel and impeller wheel, bypassing a hydrokinetic connection between them, and releases the turbine and impeller, thereby reestablishing the hydrokinetic connection.

2. Description of the Prior Art

U.S. Pat. No. 5,209,330, assigned to the assignee of the present invention, describes a torque converter assembly for use in an automatic transmission, a slipping bypass clutch for mechanically connecting the impeller and turbine of a torque converter, and a damper subassembly driven by the bypass clutch for reducing vibrations and noise in the torque converter assembly and to modulate torque oscillations due to operation of the bypass clutch. That patent describes the use of a drive plate welded to an impeller cover and extending radially inward toward the axis of the torque converter, a piston plate slidably mounted on the hub of a turbine wheel adjacent the drive plate, a drive ring riveted to the piston plate and defining a system of axially directed spline teeth on the outer periphery of the ring. The radially inner surface of the drive plate is formed with spline teeth that are continually engaged with the splines of the drive ring to produce a drive connection between the piston plate and the impeller cover.

When the torque converter bypass clutch is released, oscillation in the spline connection between the drive plate and drive ring produces unwanted noise.

SUMMARY OF THE INVENTION

It is an object of this invention to provide a reliable, easy-to-assemble drive connection between a drive plate and piston plate in an automatic transmission torque converter bypass clutch assembly that transmits torque between the components without producing noise, despite engine speed variations. Advantages of the invention include its ease of assembly and installation and its functional reliability.

In realizing these objects and advantages, the invention includes a drive plate fixed to the impeller cover and formed with a first hole, a piston plate located near the drive plate, supported for displacement relative to the drive plate, and having a second hole substantially aligned with the first hole. A piston pin, fixed to the piston plate, has a shank extending into the second hole, a body extending from the piston plate into the first hole, and a third hole directed radially from the axis of the piston pin. A spring clip, located in an annular space between the pin body and drive plate at the first hole, contacts the pin body and drive plate and resiliently, drivably connects the pin body and drive plate.

The pin body has a circular, cylindrical outer surface having an axis directed substantially parallel to the axis of the torque converter, and the spring clip contacts the pin body an first contact positions mutually spaced angularly about the axis of the pin, and contacts the drive plate at second contact positions mutually spaced angularly about the axis of the pin and spaced angularly with respect to said first locations.

BRIEF DESCRIPTION OF THE DRAWINGS

FIG. 6 is an end view of a sleeve spring taken in direction 6 of FIG. 5.

FIG. 7 is a perspective view of the sleeve spring.

FIG. 8 is a partial cross section of a torque converter showing a spring clip located between a drive plate and piston pin.

FIG. 9 is a cross section taken at plane 9—9 of FIG. 8.

DESCRIPTION OF THE PREFERRED EMBODIMENT

Figure 1:
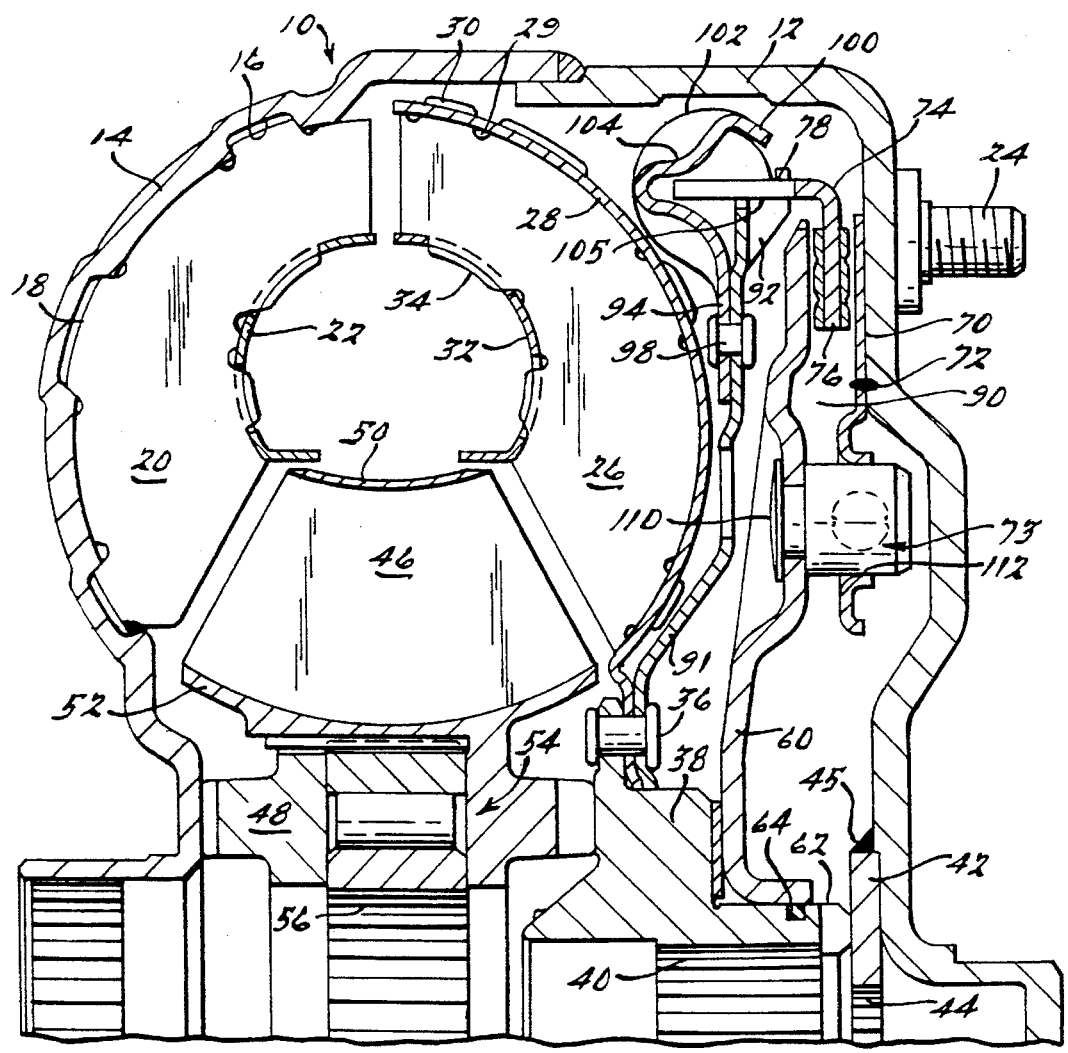
FIG. 1 is a partial cross section of a torque converter through a vertical plane showing the components of a bypass clutch and damper.

Referring first to FIG. 1, a torque converter includes an impeller cover 12 welded to an impeller shell 14 having recesses 16, which receive tabs 18 formed on the outer surface of impeller blades 20. The impeller blades are retained between shell 14 and an inner shroud 22.

Impeller cover 12 supports a circular pattern of threaded studs 24 to which a flywheel, rotatably supported on an engine crankshaft, is bolted, thereby drivably connecting the cover to the engine.

Turbine blades 26 are spaced mutually about the axis of rotation and are located with respect to the impeller blades so that the toroidal fluid flow within the torque converter exits the impeller and enters the turbine at the radially outer area and leaves the turbine at the radially inner area. The outer periphery of the turbine blades is fixed mechanically, or by welding or brazing, to a turbine shell 28, which has openings 29 that receive tabs 30 formed on the turbine blades. The inner periphery of the turbine blades is connected to an inner turbine shroud 32 by locating tabs 34 within slots formed in shroud 32 and bending the tabs over on the inner surface of the shroud, thereby fixing the position of blades 26 between shell 28 and shroud 32. Turbine shell 28 is secured by rivets 36 to a turbine hub 38 having an internally splined surface 40 adapted to engage an externally splined surface on a transmission input shaft 41. Disc 42, welded at 45 to the impeller casing, includes a splined surface 44.

Located between the flow exit section of the turbine and the flow entrance section of the impeller is a stator assembly comprising stator blades 46, spaced mutually around the axis of rotation, a hub 48 supporting blades 46, an inner shroud 50 connecting the radially inner tips of the blades, and an outer shroud 52 connecting the radially inner ends of the stator blades. An overrunning brake 54, fixed by splines 56 to a stationary sleeve shaft 57, provides one-way braking between the stator blades and the sleeve shaft.

A bypass clutch includes a piston assembly, which includes a piston plate 60, slidably mounted in an axially directed surface 62 formed on turbine hub 38 and sealed against the passage of hydraulic fluid by an O-ring 64 located in a recess formed in surface 62. Axial movement of piston 60 is limited by a shoulder formed on turbine hub 38, as FIG. 1 shows.

The drive plate 70 is fixed to the inner surface of cover 12 by a spot weld 72, which provides a seal against the passage of hydraulic fluid between the axially outer surface of drive plate 70 and the adjacent inner surface of the cover. Clutch plate 70 and piston 60 are drivably connected through cover 12 and piston pin 73 to the engine.

Drive ring 74 includes a radial leg 76, located between the inner face of drive plate 70 and the outer face of piston 60, and six axial legs 78 spaced mutually angularly about the axis of rotation and directed from leg 76 toward the turbine wheel. The surfaces of leg 76 that face plate 70 and piston 60 carry friction material 80, commonly referred to as "paper face" material, which is bonded to axially opposite radial surfaces of drive ring 74 by a bonding technique described by Frosbie, Milek and Smith in SAE Design Practices, Volume 5, (1962). The friction material may be bonded to the surfaces of piston 60 and clutch plate that face leg 76 of the drive ring.

The turbine shroud 28 and a torque converter damper support 91 are joined to a radially extending flange of turbine hub 38 at a riveted connection 36. At the radially outer end of support 91, several arcuate flanges 92, spaced angularly about the axis at 60 degree intervals, are formed. A spring retainer ring 94 includes a radially inwardly extending web, riveted to support plate 91 at angularly spaced locations 98, and an arcuate flange 100 substantially complimentary to flange 92 of the support plate. Flanges 92 and 100 define between them a substantially circular tubular cavity, in which are located six angularly spaced, helically-coiled damper springs 102. At six equally spaced angular locations spaced mutually about the axis of rotation, flange 100 of the retainer ring is formed with a local bead 104.

Drive ring 74 is supported on several arcuate surfaces 105 that coincide with the angularly spaced beads 104 and the radial ends of the support plate. Surfaces 105 guide the drive ring as it moves axially toward clutch plate 70, due to contact with the piston 60, and away from the clutch plate as pressure within control chamber 90 falls in relation to pressure on the axially opposite side of the piston. Contact between the arcuate flanges 92 and the drive ring limits the extent to which the springs are compressed. Contact between the beads and radial ends of the support plate limit the extent to which the springs can expand.

Other details of the torque converter bypass clutch damper are described in U.S. Pat. No. 5,209,330, which is assigned to the assignee of this invention.

Piston pin 73 is fixed against a shoulder formed on piston plate 60 by inserting the shank of pin 73 through a hole extending through the thickness of piston 60 and then deforming the axial end of the shank to form the head 110 of the pin. The pin is drivably connected to drive plate 90 at a flanged hole 112 formed in plate 70. Preferably, the holes 112 are angularly spaced mutually about the axis of the drive plate at four equal intervals, and piston pin 73 is fixed to piston 60 at four equally angularly spaced holes formed in the piston, which holes align with the holes of the drive plate containing the shank of pin 73.

Figures 3, 4:
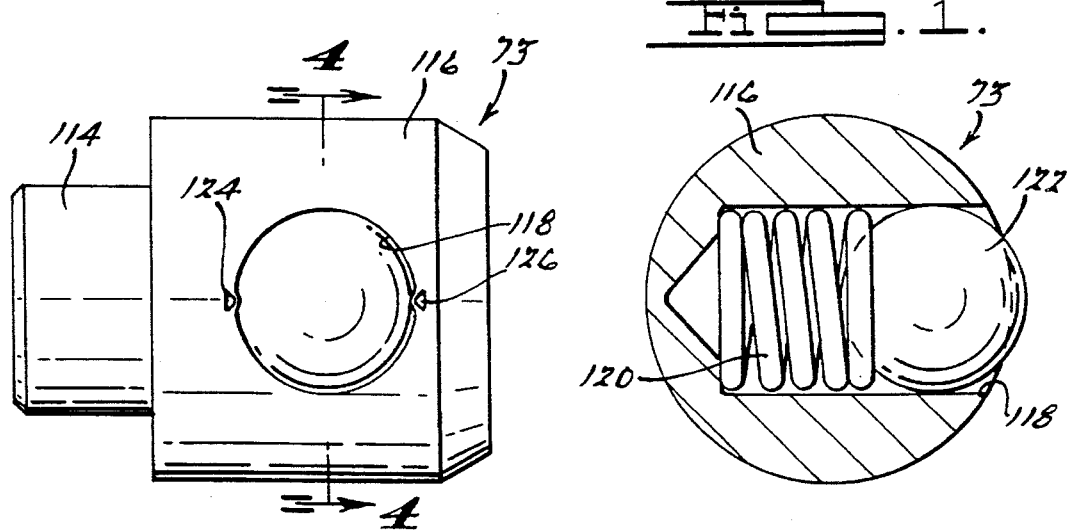
FIG. 3 is a side view of a piston pin.
FIG. 4 is a cross section taken at plane 4—4 of FIG. 3.

Referring now to FIGS. 3 and 4, the shank 114 of piston pin 73 extends axially from a cylindrical body portion 116, into which a hole 118 has been formed, directed transverse to the axis of the pin and substantially perpendicular to the axis of the torque converter. Located within the hole is a compression spring 120 and a steel ball 122 nested within the coils of the spring. The surface of the cylindrical portion 116 is deformed by staking, as best seen in FIG. 3, after the spring and ball are located within the hole, thereby preventing the ball and spring from exiting the hole after assembly. The shoulder, located where the shank and body meet, is held against the axially outer surface of the piston plate 60 after the head 110 of pin 73 is formed.

Figure 2:
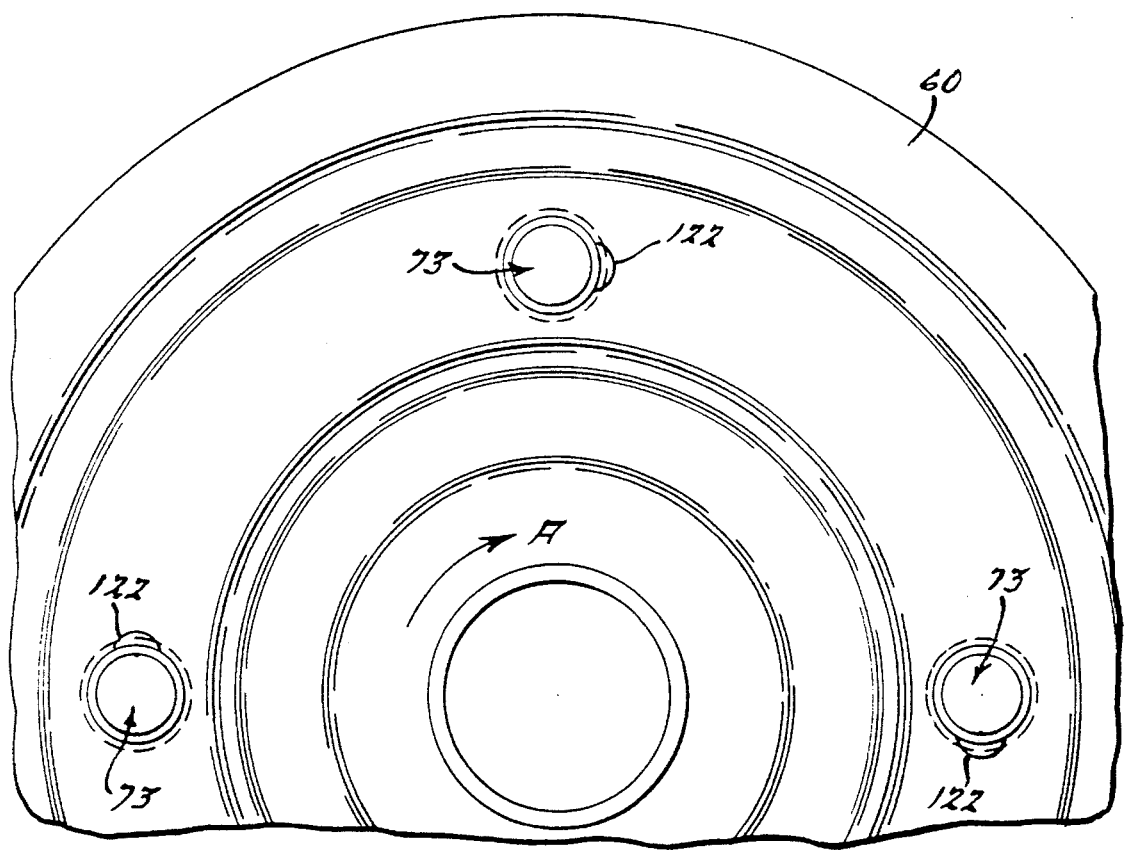
FIG. 2 is a front view of a portion of a piston plate.

FIG. 2 shows the piston pins located in the correct angular position in the piston plate so that the spring loaded detent balls 122 are directed in the correct circumferential direction. The piston plate 60 is driven by drive plate 70 through the piston pins that protrude from the piston plate. The diameter of the piston pin body 116 is smaller than the diameter of the drive plate holes 112. The detent balls 122 eliminate rattle between the piston plate and drive plate due to engine speed variations while the torque converter bypass clutch is unlocked. Compression spring 120 forces the detent ball 122 into contact with the drive plate hole and prevents the piston plate from moving relative to the drive plate hole.

The center of the detent ball on the surface of the drive plate hole 112 preferably is located diametrically opposite from the line of contact where the piston pin body contacts the surface of the drive plate at hole 112. In FIG. 2, vector A represents the sense of direction of torque transmitted from the drive plate 70 to the piston pins. The cylindrical surface of the piston pin body 116 contacts the cylindrical surface of hole 112. Preferably, the magnitude of the product of each spring force urging a detent ball into contact with the drive plate, times the radius from the axis of the torque converter to the center of a piston pin, is approximately equal to one-fourth of the inertia load transmitted from the drive plate to the piston plate through each piston pin. Contact between the detent ball and drive plate hole should remain in the drive plate hole during engagement and disengagement of the piston plate.

Figure 5:
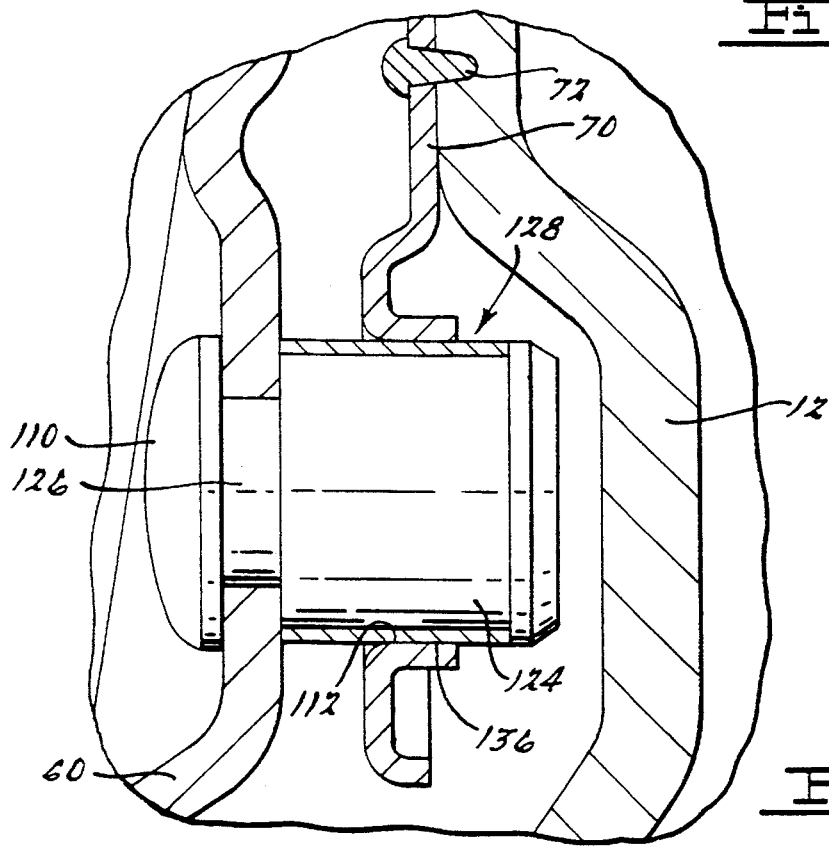
FIG. 5 is a partial cross section of a converter showing an alternate technique for connecting the piston and drive plate.

An alternate technique to eliminate noise in a torque converter assembly, as illustrated in FIGS. 5–7, includes a piston pin 124 having a head 110 formed after the shank 126 of the pin is inserted through the hole in the piston plate. A spring sleeve 128, expanded radially to fit over the body portion of pin 124, resiliently contacts the outer surface of the pin. After installation on the pin, sleeve 128 is rotated about the axis of the pin to its correct angular position, shown in FIG. 6, and then the sleeve is fixed in position by staking pin material against the sleeve at 130.

FIG. 6 shows an end view of spring sleeve 128 having an elongated circular form located in its correct angular position with respect to the direction of the torsional load, represented by arrow 132, transmitted from drive plate 70 to piston plate 60.

FIG. 7 shows axially opposite end faces 134, 136 of the spring sleeve mutually spaced along the axis of pin 124. The outer surface of the pin body is a right circular cylinder. FIG. 7, a top view of the sleeve spring, shows that its contour is C-shaped and located within the annular space between the outer surface of the body of the piston pin 124 and the surface of the flanged hole 112 formed in the drive plate 70. The annular surface of sleeve 128 is circumferentially discontinuous, having two free ends 140, 142. The contour of each sleeve spring is such that the outer surface contacts the surface of hole 112 at a first point of contact 144 and near the open ends at 146, 148. At the angular plane located approximately perpendicular to the plane that contains contact point 144 and passes through the diameter of the sleeve spring, the spring contacts the outer surface of the piston pin at 150, 152.

Referring now to FIG. 8, an alternate spring clip 154 is located in the annular space between the surface of piston pin 156 and the hole 112 of drive plate 70. The spring clip includes radially directed flanges 158, preferably three such flanges, spaced mutually at equal intervals about the axis of end 156 and located adjacent the surface of drive plate 70. The spring clip also includes legs 160, preferably three such legs, extending outwardly from web 162 and mutually spaced angularly about the axis of the pin. Web 162 of spring clip 154 contacts the surface of the hole 112 of drive plate 70 at 164, 166, 168, 170. The inner surface of the spring clip web 162 contacts the surface of piston pin 156 at 172, 174, 176. The torsional load transmitted through the piston pin from the drive plate 70 to piston plate 60 is in the direction of arrow 178.

While the preferred embodiment of the present invention has been disclosed and described in detail, further modifications, enhancements, and embodiments are contemplated to be within the spirit and scope of the present invention and the following claims.

I claim:

1. In a torque converter for an automatic transmission, the torque converter having a longitudinal axis of rotation, an assembly for drivably connecting an impeller cover, and bypass clutch, comprising:

a drive plate fixed to the impeller cover having a first hole therein directed along the axis;

the bypass clutch having a piston plate located near the drive plate, supported for axial and rotational displacement relative to the drive plate, having a second hole substantially aligned with the first hole;

a pin fixed to the piston plate having a shank extending into the second hole, a body extending from the piston plate into the first hole; and a spring clip located in an annular space between the pin body and drive plate at the first hole, contacting the pin body and drive plate and resiliently drivably connecting the pin body and drive plate.

2. The assembly of claim 1 wherein:

the pin body has a circular cylindrical outer surface having an axis directed substantially parallel to the axis of the torque converter; and the spring clip contacts the pin body at first contact positions mutually spaced angularly about the axis of the pin, and contacts the drive plate at second contact positions mutually spaced angularly about the axis of the pin and spaced angularly with respect to said first locations.

3. The assembly of claim 2 wherein:

the first hole has a surface extending substantially parallel to the pin axis; and the spring clip comprises a sleeve surrounding and extending along the pin body, having a noncircular cylindrical contour, an inner surface of the sleeve contacting the pin body at first contact positions mutually spaced angularly about the axis of the pin and extending along the pin body, and contacting the drive plate at second contact positions mutually spaced angularly about the axis of the pin, spaced angularly with respect to said first contact positions, and extending along the surface of the first hole.

4. The assembly of claim 3 wherein the first contact positions include three positions substantially equally angularly spaced about the pin axis, the second contact positions include three positions substantially equally angularly spaced about the pin axis and substantially equally angularly spaced about the pin axis from the first contact positions.

5. The assembly of claim 3 wherein the first contact positions are located at diametrically opposite sides of the pin axis, the second contact positions are located substantially at diametrically opposite sides of the pin axis and substantially equally spaced angularly about the pin axis from the first contact positions.

6. The assembly of claim 1, wherein:

the piston plate includes a first surface facing the drive plate and a second surface facing away from the drive plate;

the shank and body of the pin form a shoulder contacting said first surface;

the shank of the pin extends through the second hole and outward from the second surface; and the portion of the shank of the pin that extends through the second hole from the second surface is formed with a head larger than the second hole, said head contacting the second surface, whereby the pin is fixed to the piston plate between the shoulder and head.

7. In a torque converter for an automatic transmission, the torque converter having a longitudinally directed axis of rotation, an assembly for drivably connecting an impeller cover and bypass clutch, comprising:

a drive plate substantially concentric about said axis, fixed to the impeller cover, having multiple first holes mutually spaced about said axis, directed along said axis;

the bypass clutch having a piston plate concentric about said axis, located adjacent the drive plate, supported for axial and rotational displacement relative to the drive plate, having multiple second holes mutually spaced about said axis, each second hole substantially aligned with a first hole;

pins fixed to the piston plate, mutually spaced about said axis, each pin substantially aligned with a first hole and second hole, having a shank extending into a second hole, a body extending from the piston plate into a first hole;

spring clips, each spring clip located in an annular space between a pin body and a drive plate at a first hole, contacting the said pin body and drive plate and resiliently drivably connecting the pin body and drive plate.

8. The assembly of claim 7 wherein:

each pin body has a circular cylindrical outer surface having an axis directed substantially parallel to the axis of the torque converter; and each spring clip contacts a corresponding pin body at first contact positions mutually spaced angularly about the axis of the corresponding pin, and contacts the drive plate at second contact positions mutually spaced angularly about the axis of said pin and spaced angularly with respect to said first locations.

9. The assembly of claim 8 wherein:

each first hole has a surface extending substantially parallel to the corresponding pin axis; and each spring clip comprises a sleeve surrounding and extending along the corresponding pin body, having a non-circular cylindrical contour, an inner surface of the sleeve contacting said pin body at first contact positions mutually spaced angularly about the axis of said pin and extending along said pin body, and contacting the drive plate at second contact positions mutually spaced angularly about the axis of said pin, spaced angularly with respect to said first contact positions, and extending along the surface of the first hole.

10. The assembly of claim 9 wherein the first contact positions include three positions substantially equally angularly spaced about the pin axis, the second contact positions include three positions substantially equally angularly spaced about the pin axis and substantially equally angularly spaced about the pin axis from the first contact positions.

11. The assembly of claim 9 wherein the first contact positions are located at diametrically opposite sides of the pin axis, the second contact positions are located substantially at diametrically opposite sides of the pin axis and substantially equally spaced angularly about the pin axis from the first contact positions.

12. The assembly of claim 7 wherein:

the piston plate includes a first surface facing the drive plate and a second surface facing away from the drive plate;

the shank and body of each pin form a shoulder contacting said first surface;

the shank of each pin extends through a corresponding second hole and outward from the second surface; and the portion of the shank of each pin that extends through the corresponding second hole from the second surface is formed with a head having a diameter larger than the diameter of the second hole, said head contacting the second surface, whereby each pin is fixed to the piston plate between the shoulder and head.

* * * * *